US006985636B1

(12) United States Patent
Semenchenko (10) Patent No.: US 6,985,636 B1
(45) Date of Patent: Jan. 10, 2006

(54) IMAGE PROCESSING METHOD (76) Inventor: Michail Grigorievich Semenchenko, ul. Orbeli, 25-5-35, St. Petersburg, 194223 (RU)

( * ) Notice: Subject to any disclaimer, the term of this patent is extended or adjusted under 35 U.S.C. 154(b) by 0 days.

(21) Appl. No.: 09/786,477

(22) PCT Filed: Aug. 4, 1999

(86) PCT No.: PCT/RU99/00272

§ 371 (c)(1),
(2), (4) Date: Mar. 2, 2001

(87) PCT Pub. No.: WO00/14684

PCT Pub. Date: Mar. 16, 2000

(30) Foreign Application Priority Data

Sep. 3, 1998 (RU) .................................. 98116546

(51) Int. Cl.
*G06K 9/40* (2006.01)
(52) U.S. Cl. ..................................... 382/266; 382/304
(58) Field of Classification Search ................ 382/280, 382/278, 279, 266, 254
See application file for complete search history.

(56) References Cited

U.S. PATENT DOCUMENTS 4,463,375 A * 7/1984 Macovski ................. 378/98.12
4,503,461 A * 3/1985 Nishimura ................ 378/98.12

(Continued)

FOREIGN PATENT DOCUMENTS

EP 756 247 A1 1/1997

(Continued)

OTHER PUBLICATIONS

Anandakumar K. et al.: "Nonlinear filtering using generalized subband decomposition", Proceedings of the International Conference on Image Processing (ICIP). U.S., Los Alamitos, IEEE comp. Soc. Press, 1995, pps. 382-385. ISBN: 0-7803-3122-2.

(Continued)

*Primary Examiner*—Joseph Mancuso
*Assistant Examiner*—Dennis Rosario
(74) *Attorney, Agent, or Firm*—Rader, Fishman & Grauer PLLC (57) ABSTRACT

Image processing method comprises providing an original image as a matrix of discreet picture elements, splitting the original image into n frequency channels, each channel being presented by an image matrix of the same size as the original image, detecting edges, and assembling an output (enhanced) image from the n frequency channels, the assembling taking the detected edges into account. The n frequency channels are represented by a low frequency channel and n−1 high frequency channels while splitting the original image into frequency channels, and the edge detection is performed by calculating a correlation value between processed pixel and its neighboring pixels in each of n−1 selected high channels followed by comparing the correlation value with that for the corresponding pixels in other high frequency channels and with the threshold value for this channel. Based on the results of the comparison, weighting coefficients are formed for each pixel of each of the n−1 high frequency channels, and the assembling of the output image is made by summing each pixel from the low frequency channel with all products of the corresponding (by their location in the image) pixels of n−1 high frequency channels by their weighting coefficients. The method enhances image sharpness and contrast in conjunction with simultaneous noise suppression.

23 Claims, 8 Drawing Sheets

U.S. PATENT DOCUMENTS

| | | | |
|---|---|---|---|
| 4,747,152 A | | 5/1988 | Knutsson et al. |
| 5,003,618 A | * | 3/1991 | Meno .......................... 382/261 |
| 5,038,388 A | | 8/1991 | Song |
| 5,270,654 A | * | 12/1993 | Feinberg et al. ............ 324/309 |
| 5,351,305 A | | 9/1994 | Wood et al. |
| 5,381,490 A | | 1/1995 | Shin |
| 5,526,446 A | | 6/1996 | Adelson et al. |
| 5,563,963 A | | 10/1996 | Kaplan et al. |
| 5,602,934 A | * | 2/1997 | Li et al. ..................... 382/128 |
| 5,657,401 A | | 8/1997 | De Haan et al. |
| 5,708,693 A | | 1/1998 | Aach et al. |
| 5,739,922 A | * | 4/1998 | Matama ...................... 358/447 |
| 5,852,475 A | * | 12/1998 | Gupta et al. ................. 348/606 |
| 5,892,850 A | * | 4/1999 | Tsuruoka .................... 382/240 |
| 5,907,642 A | * | 5/1999 | Ito ............................. 382/302 |
| 6,175,657 B1 | * | 1/2001 | Mancuso et al. ........... 382/261 |
| 6,252,983 B1 | * | 6/2001 | Takeshima et al. ......... 382/168 |
| 6,463,167 B1 | * | 10/2002 | Feldman et al. ............ 382/128 |

FOREIGN PATENT DOCUMENTS

| | | |
|---|---|---|
| EP | 1 133 757 B1 | 11/2002 |
| RU | 2015561 | 4/1991 |

OTHER PUBLICATIONS

Yiping P. Du, Dennis L. Parker: "Vessel Enhancement Filtering in Three-Dimensional MR Angiograms Using Long-Range Signal Correlation", J Magnetic Resonance Imaging 1997, 7, pps. 447-450.

* cited by examiner

IMAGE PROCESSING METHOD

TECHNICAL FIELD

The present invention relates to the automatics and computation techniques and, more particularly, to methods of the preliminary image processing for sharpening and contrast enhancement.

DESCRIPTION OF THE RELATED ART

One of the methods known in the prior art is described in the Russian Patent No. 2015561, published on 16 Apr. 1991, Int. Class G06K 9/40. According to this invention, the image correction is made basing on the analysis of the original image at the processed pixel and the local average value over some neighborhood of this pixel.

The method of that patent smoothes the original image, thus producing the smoothed image containing the low frequency components presenting the image background. Then the smoothed image is subtracted from the original one producing the second image containing high frequency components without background, said second image is then emphasized and added to the smoothed image.

The disadvantage of this method is that it emphasizes not only the useful signal but also the noise containing in high frequency image components, thus degrading the quality of the enhanced image.

The method according to U.S. Pat. No. 5,038,388, published on 6 Aug. 1991, Int. Class G06K 9/40, smoothes the original image and subtracts the smoothed image from the original one thus producing the second image containing the high frequency image components only. The second image is then adaptively emphasized so that the larger is a difference between the processed pixels and its neighborhood, the higher are their scaling factors. The output image is produced by adding the adaptively emphasized second image to the original image, thus sharpening the image without the noise amplification.

The solution disclosed in this patent does not provide any noise suppression as this method can only emphasize the high frequency image components that may contain a noise.

Furthermore, the disadvantage of this method known in the art is that it fails to improve considerably the sharpness of weak edges as such enhancement requires to emphasize the high frequency image components in the regions where a difference between the processed pixel and its neighborhood is comparable to the noise level. Therefore, the edge enhancement in such regions causes the noise emphasis.

According to the image processing method disclosed in U.S. Pat. No. 5,381,490, published on 10 Jan. 1995, Int. Class G06K 9/40, the largest difference $\Delta$ between the processed pixel and its nearest neighbors is calculated. Depending on the magnitude of this difference, one of the three processing modes is selected:
- edge enhancement by means of emphasis of the high frequency image components if $\Delta > T_1$, $T_1$ presenting the first pre-defined threshold value;
- reproduction of the original image, if $T_2 < \Delta < T_1$, where $T_2$ stands for the second pre-defined threshold value;
- image smoothing to suppress a noise, if $\Delta < T_2$.

The first disadvantage of this method is that it may emphasize the noise selectively if the difference $\Delta$ varies around any of the threshold values for some neighboring pixels thus transforming small differences between neighboring pixels into larger ones by involving different processing modes for these neighboring pixels.

Furthermore, this method fails to provide quality enhancement of images with different noise magnitudes without tuning as the threshold values $T_1$ and $T_2$ are not selected adaptively.

Another approach to the noise suppression in images is described in U.S. Pat. No. 5,563,963, published on 8 Oct. 1996, Int. Class G06K 9/40. The method of this patent operates by selecting a plurality of groups of neighbors for each pixel of the original image, each group being a square containing N×N pixels, N varying for example from 2 to 21. A processed pixel may be located at any position inside this square group of pixels. The least square best fit plane (the planar approximation) is then used to approximate pixel values in each of selected pixel groups and the new value for the processed pixel and the goodness of fit are computed based on the approximation for each group.

The target pixel of an enhanced image is produced by the weighted summing of all the new pixel values, thereat the higher is the goodness of fit for a group the higher is the weight of this group.

The disadvantage of this method is that it fails to enhance edges as this method provides the noise smoothing only. Furthermore, this method requires substantial computation efforts to build least square approximations by hundreds of groups for each of hundreds of thousands of pixels.

The method disclosed in U.S. Pat. No. 5,739,922, published on 14 Apr. 1998, Int. Classes G06K 9/40, H04N 1/40, operates by splitting an original color image into three isotropic frequency channels: low frequency image components (LF), medium frequency components (MF) and high frequency components (HF). Adaptive emphasis of the HF components and adaptive suppression of the MF components is then carried out, thereat the higher is the correlation between at least two of three basic image colors the higher are multipliers for HF and MF image components. The enhanced image is obtained by summing the LF image components with the adaptively suppressed MF components and the adaptively emphasized HF image components.

The image processing method and apparatus described in that patent may have limited application as they are suitable for color images only since it is the correlation between color components only that is used for carrying out the image processing.

Furthermore, the noise suppression according to this invention is significantly limited, as the HF image components, that also contain noise, may be emphasized only, and the noise suppression in MF image components is limited because no directional splitting of the original image is used.

No edge detection and enhancement can be obtained by this method as the isotropic frequency channels are used.

All these disadvantages degrade the quality of enhanced images.

The most relevant image processing method is described in U.S. Pat. No. 5,351,305, published on 27 Sep. 1994, Int. Class G06K 9/40. According to this patent, a plurality of directionally filtered images is obtained from the original image by applying directional filters in a frequency domain. An enhanced image is then formed by selecting each target pixel either from a directionally filtered image, if a contrast edge is detected nearby the processed pixel or from the original image otherwise. Thereat, the contrast edge is detected nearby the processed pixel by generating the standard deviation image and by producing an eigenvector description of this image. The eigenvector length is compared to a pre-determined threshold value to detect the edge.

The target pixel is equal to the corresponding pixel of the original image, if the edge was not detected nearby. Otherwise, the target pixel is selected from the image filtered with the most nearly corresponding direction of filtering.

While detecting edges, the eigenvector length may vary around the threshold value for several adjacent pixels. Whereby, the neighboring pixels of the enhanced image are selected from different images (the original image and directionally filtered image) thus causing the selective noise emphasis. This emphasis degrades the enhanced image quality.

Furthermore, original images may differ in their noise levels thus requiring different threshold values. The method does not include adaptive selection of the threshold value and therefore may not provide high quality processing of images with different noise levels.

Provided that the edge is detected nearby, the selection of pixels of the enhanced image is made from one of the plurality of directionally filtered images thus causing the complete suppression of all image structures that differ by their direction from the detected edge, notwithstanding that those structures can be clearly seen in the original image.

SUMMARY OF THE INVENTION

The object of the claimed invention is to provide an improved method for enhancing the image sharpness and contrast combined with simultaneous noise suppression.

This objective according to the present invention is achieved in a image processing method, comprising the steps of providing an original image as a matrix of discreet picture elements (pixels), splitting the original image into n frequency channels, each of the channel being presented by an image matrix of the same size as the original image, detecting edges and assembling the output image from said n frequency channels taking the detected edges into account.

The step of splitting the original image is performed into a low frequency channel and n-1 high frequency channels and the edge detection is performed by computation in each of n-1 selected high frequency channels of a correlation between processed pixel and its neighboring pixels, followed by a comparison of the correlation value with that for corresponding pixels in other high frequency channels and with a threshold value for this channel. Based on the results of the comparison, weighting coefficients are formed for each pixel of each of the n-1 high frequency channels, and the assembly of the output image is made by summing each pixel from the low frequency channel with all products of the corresponding (by their location in the image) pixels of the n-1 high frequency channels by their weighting coefficients.

The objectives of the invention is also achieved by selection of m of the n-1 high frequency channels (2<m<=n-1) in such a way that they differ one from another in the direction of principal passing only. Therewithal, the weighting coefficients for any of the pixels of any of the m high frequency channels are defined based on the comparison of its correlation value to the threshold value and to the correlation values of the corresponding (by their location in the image) pixels of other m-1 high frequency channels.

The objectives of the invention is also achieved by computation of correlation values as a product of the processed pixel value and the weighted sum of its neighbors, the weights being anisotropic, the direction of this anistropy corresponding to the direction of principal passing of the processed channel.

Furthermore, the threshold value for any of the n-1 high frequency channels is determined by analysis of distribution of values, or absolute values, of pixels in this channel. The threshold value may be also determined by analysis of distribution of values, or absolute values, of pixels of the original image.

The image processing method claimed as the invention is characterized by the following features that distinguish it from the most relevant method known in the prior art:

1. while splitting the original image into n frequency channels, the low frequency channel and n-1 high frequency channels are selected;

2. the value of correlation between the processed pixel and its neighboring pixels is used to detect edges in the image. More specifically, the value of the correlation is compared to the correlation values for the corresponding (by their location in the image) pixels in other n-1 high frequency channels and to the threshold value for this channel. The weighting coefficients for all pixels of the n-1 high frequency channels are generated as a result of this comparison;

3. the output image is assembled by means of summing each pixel from the low frequency channel and all the corresponding (by their location) pixels from the n-1 high frequency channels multiplied by their respective weighting coefficients.

Concerning the first feature, it should be noted that the extraction of the low frequency channel that is not a subject of any processing provides the distortion-free reproduction of large-scale structures of the original image in the enhanced image, as these objects are passed through the low frequency channel without any processing. Therewithal the energy of noise passing through the low frequency channel without suppression is inherently low as most of the noise energy is concentrated at high frequencies.

Furthermore, the extraction of the low frequency channel helps reduce the computation power needed to find correlation values for n-1 high frequency channels, as the subtraction of the local average value is required to compute correlation. This subtraction is made while extracting (subtracting from the original image) the low frequency channel.

The splitting of the original image into several high frequency channels helps improve, as compared to selection of one or two channels only, the noise suppression, as the noise associated with pixels of those frequency channels, where edges were not found nearby, is prevented from contributing to the enhanced image.

Concerning the second feature, it should be noted that edge detection by means of the correlation value between the processed pixel and its neighbors allows to find weak edges against a noisy background as the correlation value is close to zero for a typical noise, thereat the correlation values for adjacent pixels forming the edge are positive and of a similar magnitude. This difference in a correlation behavior helps achieve high noise suppression combined with edge emphasis thus increasing the image quality.

The edge detection based on the correlation between a processed pixel and its neighbors makes the method of the present invention applicable to various types of images, including color and gray scale and vector images, as well as multi-dimensional images. Furthermore, the use of this correlation provides a quantitative measure of the edge intensity for each image pixel. This feature allows performing the selective emphasis of edges having certain intensity, for example, weak edges.

The third specific feature, namely assembling the enhanced image by weighted summing images from all frequency channels, helps remove completely the effect of a selective noise emphasis. This effect is caused by selection of neighboring pixels from different frequency channels.

Furthermore, the determination of the threshold value by means of analysis of statistical distribution of pixels provides a high quality processing of images with materially different noise magnitudes without changing parameters.

Furthermore, the use of anisotropic frequency channels and anisotropic weights makes the image processing method highly sensitive to weak edges.

BRIEF DESCRIPTION OF DRAWINGS

These and other features and advantages of the invention will appear from the following description in which a preferred embodiment has been set forth in detail in conjunction with the accompanying drawings of the apparatus that implements the claimed method, where

The preferred embodiment of the sub-units of said apparatus are shown in more detail in FIGS. 2–5, where.

DETAILED DESCRIPTION OF THE INVENTION

Figure 1:
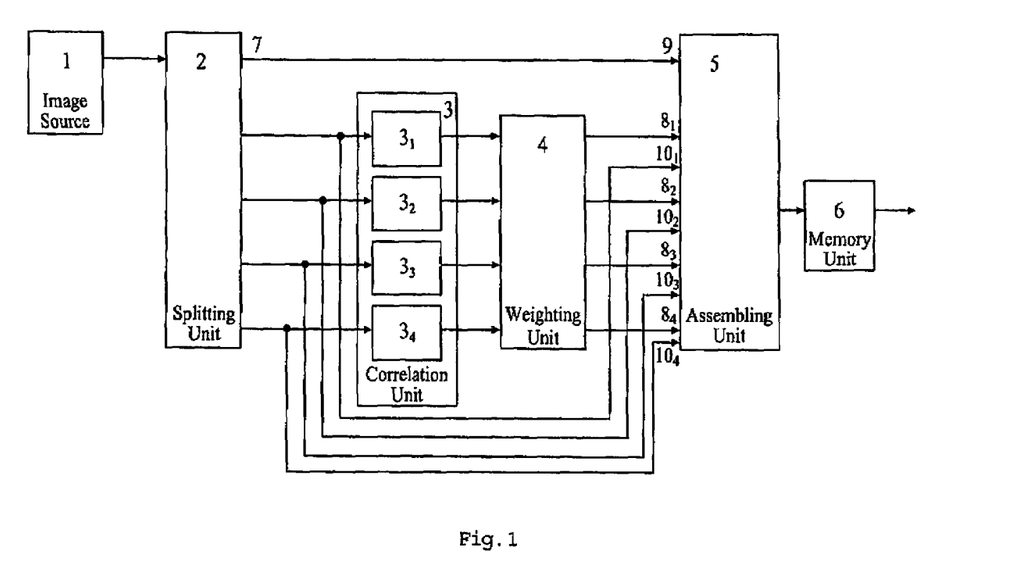
FIG. 1 is a block diagram, of the apparatus.

Referring to FIG. 1, the apparatus contains an image source 1, an output of the image source being connected to an input of a splitting unit 2. A low frequency output 7 of the splitting unit 2 is connected to an input 9 of an assembling unit 5, wherein all other outputs of the splitting unit 2 are connected to corresponding inputs of a correlation unit 3. These other outputs are also connected to inputs $10_1$–$10_4$ of the assembling unit 5. Outputs of the correlation unit 3 are connected to the corresponding inputs of a weighting unit 4, its outputs being inputs $8_1$–$8_4$ of the assembling unit 5. Thereat an output of the assembling unit 5 is connected to an input of a memory unit 6, an output of the memory unit 6 being an output of the apparatus.

Figure 2:
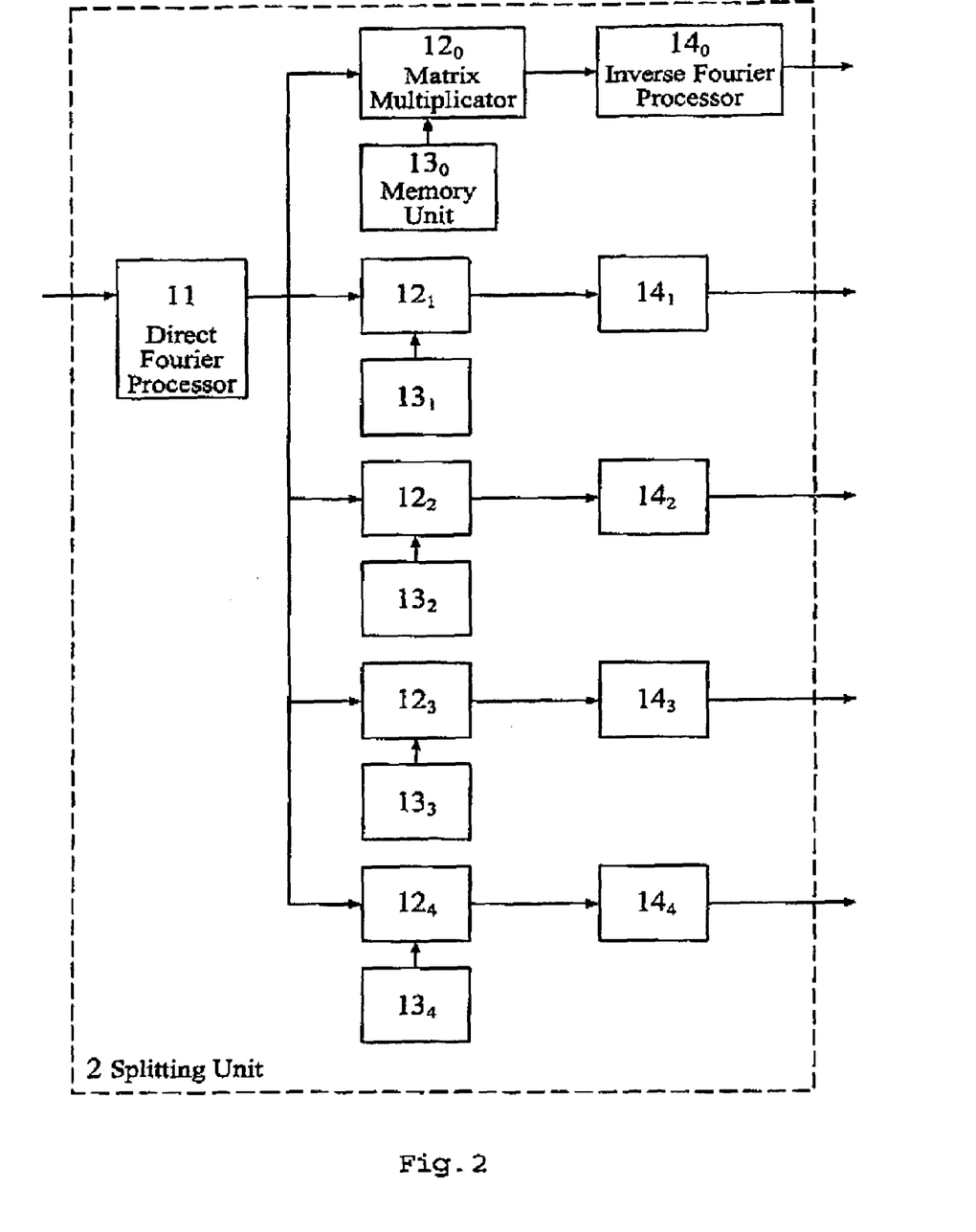
FIG. 2 is a block diagram of a frequency channel splitting unit 2 of FIG. 1 (further referred to as splitting unit)

FIG. 2 shows the preferred embodiment of the splitting unit 2 in more detail. The unit includes a direct Fourier processor 11, whose input processor is connected to the output of image source 1, whereas an output of the direct Fourier processor 11 is connected to first inputs of matrix multiplicators $12_0$–$12_4$. Second inputs of the multiplicators are connected to corresponding memory units $13_0$–$13_4$, the memory units holding pre-defined channel selection matrixes shown in FIG. 6. Any of the matrix multiplicators $12_0$–$12_4$ performs an element-by-element multiplication of matrixes supplied to its two inputs. Outputs of the matrix multiplicators $12_0$–$12_4$ are connected to inputs of inverse Fourier processors $14_0$–$14_4$. An output of the inverse Fourier processor $14_0$ is connected to the input 9 of the assembling unit 5, and outputs of the inverse Fourier processors $14_1$–$14_4$ are connected to the inputs $10_1$–$10_4$ of the assembling unit 5, as well as to the corresponding inputs of the correlation unit 3.

Figure 3:
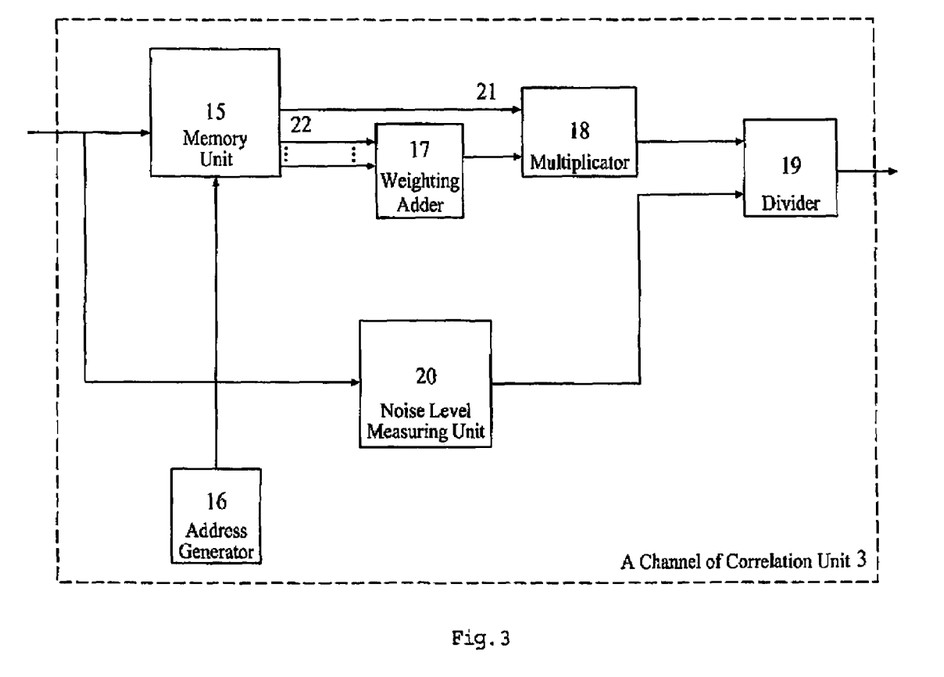
FIG. 3 is a block diagram of one channel of a unit 3 of FIG. 1 for computation of correlations (further referred to as correlation unit)

FIG. 3 shows in more detail one channel of the correlation unit 3. A memory unit 15 holds the image of the respective frequency channel. An input of this memory unit is the input of the correlation unit 3. It is connected also to input of a noise level measuring unit 20, an output of which unit is connected to a first input of a divider 19. A second input of the divider 19 is connected to an output of a multiplicator 18 whose first input is connected to a first output of the memory unit 15. Other outputs of the memory unit 15 are connected to a weighting adder 17. An output of the weighting adder is a second input of the multiplicator 18. An address input of the memory unit 15 is connected to an address generator 16. An output of the divider 19 is the output of the correlation unit 3.

The noise level measuring unit 20 may be implemented according to the U.S. Pat. No. 5,657,401, published on 12 Aug. 1997, Int. Class G06K 9/40, which is incorporated herein by reference.

All of the memory units are of the random access memory type, and DIMM PC133 128 Mb memory modules manufactured by IBM, or other similar ones well known in the art can be used for that purpose.

The weighting adder 17 may be implemented as eight scalar multiplicators (the number of the multiplicators is equal to the number of adjacent pixels) and an adder. Any of the scalar multiplicators has two functionally identical inputs and one output. The outputs of all of the scalar multiplicators are connected to inputs of the adder, the output of the adder being the output of the unit 17. The first inputs of the scalar multiplicators are the inputs of the unit 17, and pre-defined weighting coefficients are supplied to the second inputs of the multiplicators.

Figure 4:
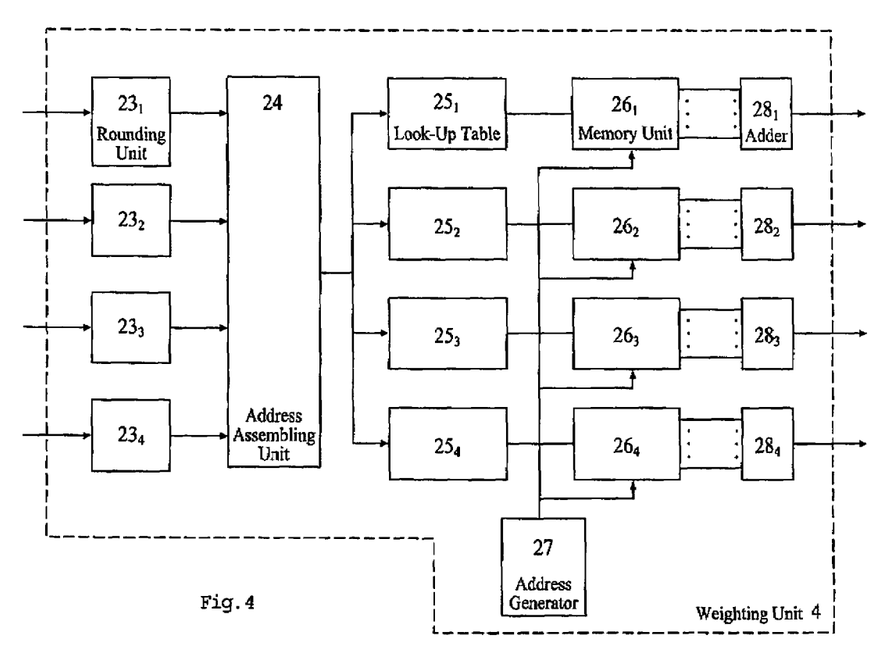
FIG. 4 is a block diagram of a unit 4 of FIG. 1 for forming weighting coefficients (further referred to as weighting unit)

FIG. 4 shows the weighting unit 4. The four inputs of the weighting unit 4 are inputs of four rounding units $23_1$–$23_4$, outputs of the rounding units are connected to inputs of an address assembling unit 24. An output of the unit 24 is connected to inputs of four look-up tables $25_1$–$25_4$. The look-up table is a memory unit that stores the values of a weighting coefficient for any set of the four input correlation values. Outputs of the look-up tables $25_1$–$25_4$ are connected to inputs of memory units $26_1$–$26_4$, accumulating values of the weighting coefficients. Address inputs of the memory units $26_1$–$26_4$ are connected to an address generator 27, and outputs of the memory units $26_1$–$26_4$ are connected to inputs of adders $28_1$–$28_4$ for averaging the weighting coefficients. Outputs of the adders are the outputs of the weighting unit 4.

Figure 5:
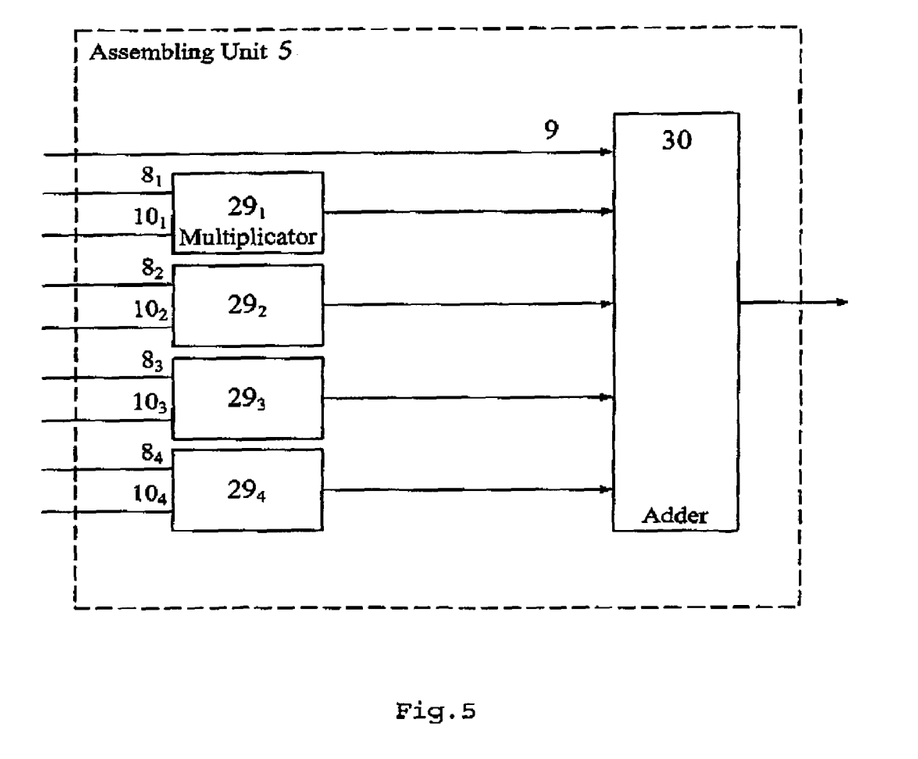
FIG. 5 is a block diagram of the unit 5 of FIG. 1 to assemble an output image (further referred to as assembling unit)

FIG. 5 shows the assembling unit 5. It consists of four multiplicators $29_1$–$29_4$ and an adder 30. The first inputs $8_1$–$8_4$ of the multiplicators are connected to the outputs of the weighting unit 4, and the second inputs $10_1$–$10_4$ of the multiplicators are connected to the outputs of the splitting unit 2. The outputs of the multiplicators $29_1$–$29_4$ are connected to corresponding inputs of the adder 30, and, as was disclosed in the above, the input 9 of the adder is connected to the low frequency output 7 of the splitting unit 2. An output of the adder 30 is the output of the assembling unit 5, and it is connected to the input of the memory unit 6 that accumulates an enhanced image.

Figure 6:
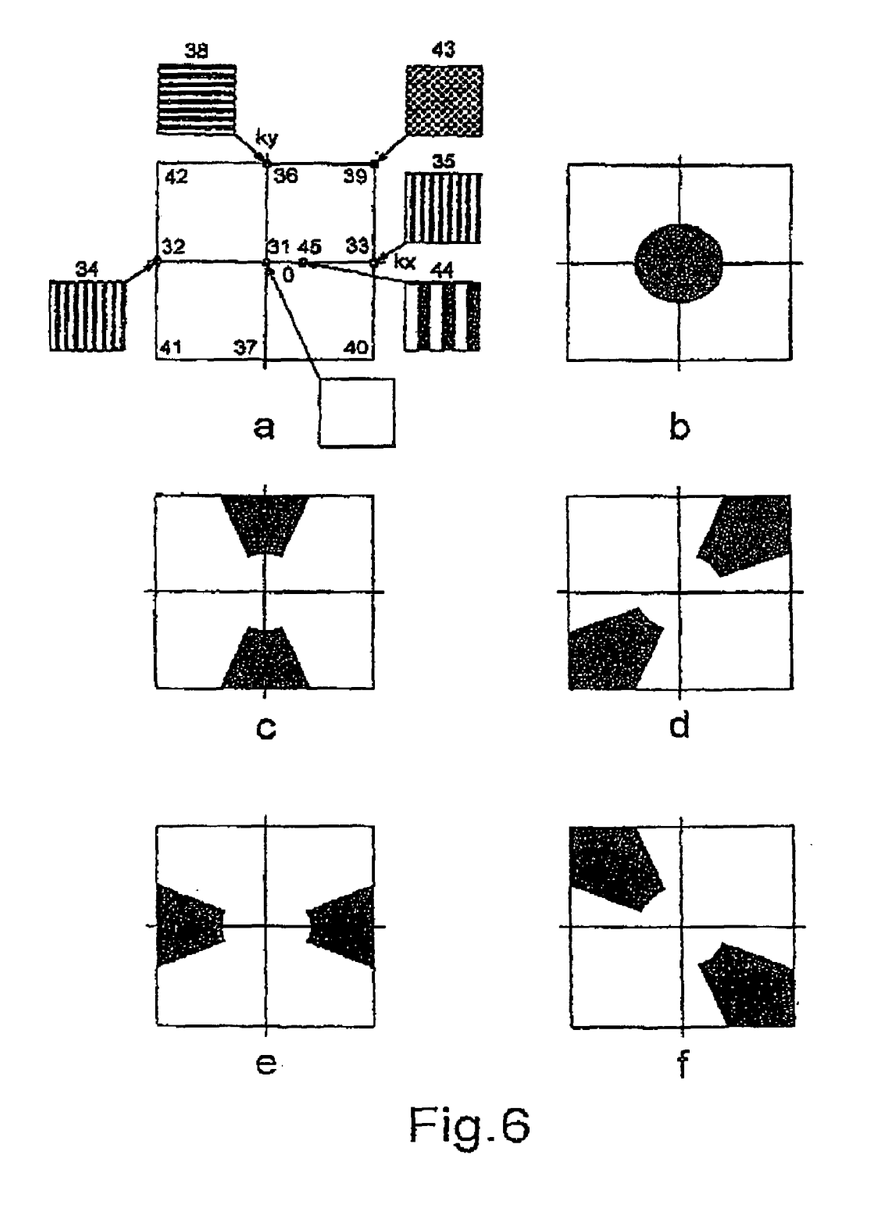
FIG. 6 shows an example of pre-defined channel selection matrixes.

The apparatus implements the claimed method as it is described hereinafter in more detail. Referring to FIG. 1, an input image is generated by the image source 1. A Magnetic Resonance Imaging (MRI) unit may be used, for example, as the image source 1. This MRI unit produces an image of a cross-section of an object, this image being a matrix containing discreet picture elements (pixels). The image is carried to the input of the splitting unit 2. The operation of the splitting unit 2 is described with a reference to FIG. 2, FIG. 6, and FIG. 7. The input image is transformed to the frequency presentation by the direct Fourier processor 11. This frequency presentation contains complete information about the original image and is represented by the matrix of the same size as an input image. This matrix is passed to identical matrix multiplicators $12_0$–$12_4$, performing element-by-element multiplication of the frequency presentation of the original image by pre-defined channel selection matrixes. The channel selection matrixes are stored in the memory units $13_0$–$13_4$. Each channel selection matrix contains multipliers for all spatial frequencies of the frequency image presentation. FIG. 6 shows examples of the channel selection matrixes.

More specifically, as the image is presented by a 2D matrix, its frequency presentation is also a 2D matrix. FIG. 6a shows schematically a frequency presentation matrix. The horizontal and vertical spatial frequencies vary along axes $k_x$ and $k_y$, respectively.

The zero spatial frequency corresponds to the constant image density. It is located at the crossing point (31) of the axes $k_x$ and $k_y$.

Points 32 and 33 represent the largest spatial frequency in the horizontal direction. The examples of images contributing to these points are shown in drawings 34 and 35.

Similarly, the maximal spatial frequency in the vertical direction is located at points 36 and 37; the example of the image contributing to these points is illustrated by drawing 38.

The maximal spatial frequencies are located at points 39–42. The example of the image contributing to these maximal spatial frequencies is shown in drawing 43.

A medium spatial frequency in the horizontal direction is located at point 45. The example of the image contributing to this point is shown in drawing 44.

The location of the spatial frequencies in drawings FIG. 6(b–f) corresponds to the scheme depicted in FIG. 6a.

FIG. 6b shows schematically the pre-defined selection matrix for the low frequency channel, this matrix being stored in the memory unit $13_0$.

The dark area 46 is filled by the unit values of the matrix elements. This area corresponds to spatial frequencies that pass through the low frequency channel. The white region is filled by the zero values of the matrix elements, therefore the frequencies of the white region do not pass through the low frequency channel.

FIG. 6(c–f) show schematically the selection matrixes for four high frequency channels, the same notations as in FIG. 6b being used thereat.

It should be noted that the sum of all channel selection matrixes in FIG. 6(b–f) is the matrix with all elements equal to 1. Therefore, all the information from the original image passes through at least one channel.

Referring now to FIG. 2, each of the matrix multiplicators $12_0$–$12_4$ forms on its output the matrix of the corresponding frequency channel in the frequency presentation. The inverse Fourier processors $14_0$–$14_4$ transform these matrixes to the coordinate presentation.

The direct Fourier processor 11 and inverse Fourier processors $14_0$–$14_4$ may be implemented based on the Fast Fourier Transform algorithm, as described, for example, in: Cooley, J. M., Lewis, P. A. W. and Welch, P. D. *The Finite Fourier Transform* I.E.E.E. Trans. Audio Electroacoustics AU-17, 2, 77–86 1969.

Figure 7:
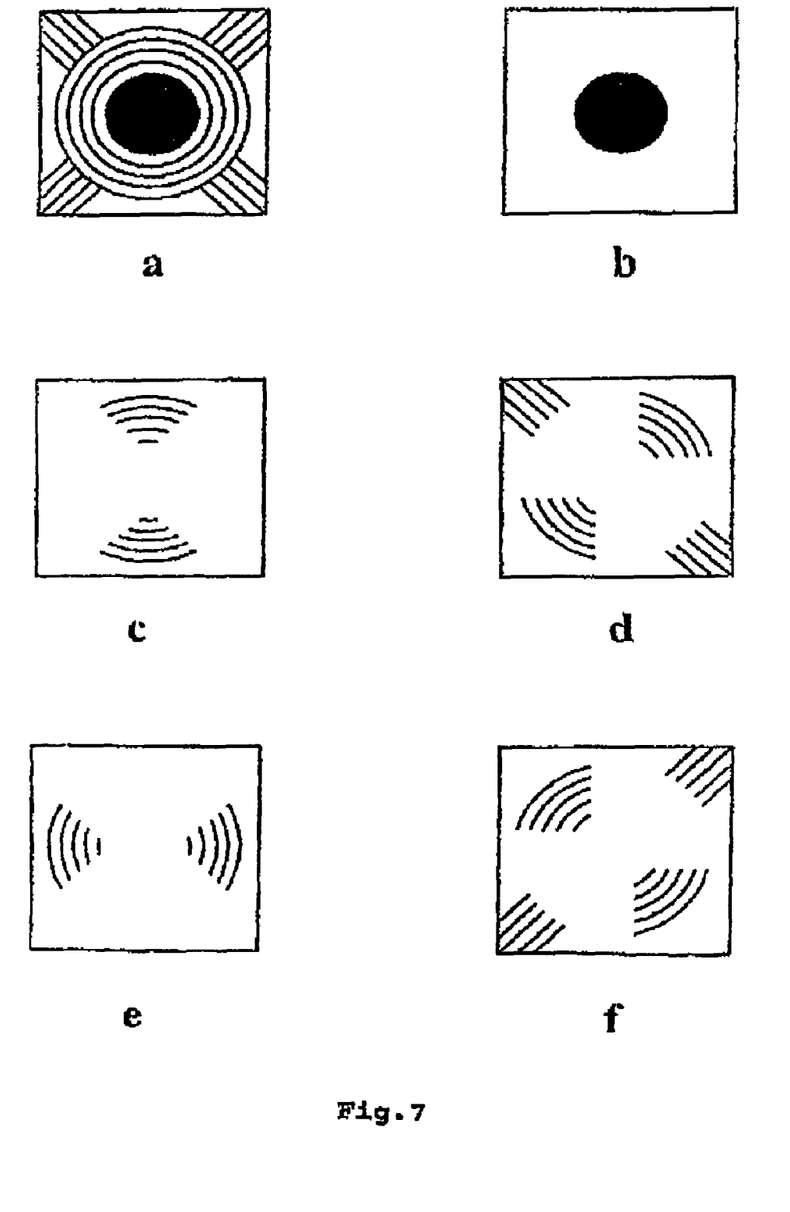
FIG. 7 illustrates the operation of the splitting unit.

FIG. 7 further illustrates operation of the splitting unit. FIG. 7a shows the example of an input image, FIGS. 7(b–f) show the images formed on the outputs of the inverse Fourier processors $14_0$–$14_4$, respectively, as a result of processing the image shown in FIG. 7a. The image of a low frequency channel 7b is carried from the output of the Fourier processor $14_0$, being the output 7 of the splitting unit 2 to the input 9 of the assembly unit 5. The images of four high frequency channels are carried from the outputs of the Fourier processors $14_1$–$14_4$, being other outputs of the splitting unit 2 to the corresponding inputs of the correlation unit 3 and to the inputs $10_1$–$10_4$ of the assembly unit 5.

The further processing of these images will be described by the example of the first high frequency channel as this processing is identical in all high frequency channels.

Referring to FIG. 3, the memory unit 15 stores the partial image of the processed channel. To compute the unnormalized correlation value, the processed pixel value 21 and values of its neighboring pixels 22 are sequentially selected from the memory 15. These values of neighboring pixels pass to the input of weighting adder 17. The adder 17 implements the following operation on pixel values:

$$r = \sum_{i=1}^{N} V_i X_i$$

where N is a number of pixels in neighborhood 22 of the processed pixel (preferably N=8), $V_i$ are the pre-defined weighting coefficients (preferably $V_i=\frac{1}{8}$) and $X_i$ are the pixel values from neighborhood 22.

Alternatively, anisotropic weights $V_i$ can be used for computation of the weighted sum r of the neighboring pixels. This approach is beneficial for cases where several high frequency channels differ one from another by the direction of their principal passing only. The direction of anisotropy of the weights $V_i$ corresponds to the direction of principal passing for the processed frequency channel.

The multiplicator 18 forms a product of the weighted sum of neighboring pixels and the processed pixel value. This product is the unnormalized correlation value for the processed pixel. It is compared to the threshold value by dividing by this threshold value (output of the noise level measuring unit 20) in the divider 19. The result of this division is compared to 1.0 in the weighting unit 4. The processing described herein is repeated for all of the pixels of the partial image of the processed frequency channel.

The image of this first frequency channel passes also to the noise level measuring unit 20. The noise level from the output of the unit 20 is used as a threshold value to normalize correlation values by the divider 19. As a result, the matrix containing the correlation values for all of the pixels of the processed frequency channel is formed on the output of the correlation unit 3, these correlation values being normalized by the threshold value for the processed frequency channel.

The correlation values formed by the correlation unit 3 are carried to the weighting unit 4. Referencing to FIG. 4, those correlation values for four frequency channels pass to inputs of the rounding units $23_1$–$23_4$. The rounding units decrease the data precision to 4 or 5 bits.

The four rounded values from outputs of the rounding units $23_1$–$23_4$, each containing 4 or 5 bits, are assembled into one 16- or 20-bit word by the address assembling unit 24. The address formed thereby is used as an input value for the four look-up tables $25_1$–$25_4$. Each of them is a memory unit that stores values of the weighting coefficients for any combination of four correlation values in four frequency channels, such combination defining thereat the address formed by the unit 24 in a unique way.

The comparison of the correlation value with correlation values for the corresponding pixels in other high frequency channels is performed by the look-up tables $25_1$–$25_4$. The values of weighting coefficients stored in these look up tables depend on the correlation values from all 4 channels.

Figure 8:
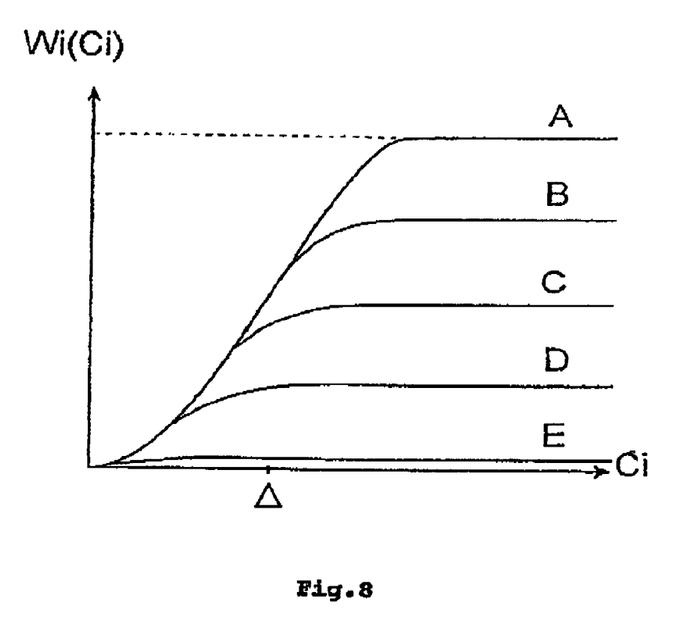
FIG. 8 is a graph showing an example of the dependence of the weighting coefficient on the correlation value.

FIG. 8 shows the preferred dependence of a weighting coefficient $W_i$ in any of the frequency channels on the correlation value $C_i$ in this channel and correlation values in other three channels, $\Delta$ representing the threshold value for tills frequency channel. The weight Wi depends on the correlation value Ci and maximal correlation value L in other three frequency channels. This dependence is illustrated in FIG. 8 by the plurality of curves:

curve A for $C_i \geq 0.7$ L,
curve B for $C_i = 0.5$ L,
curve C for $C_i = 0.3$ L,
curve D for $C_i = 0.1$ L, and
curve E for $C_i = 0.01$ L.

The weighting coefficient $W_i$ takes a minimal value for correlation values that are significantly smaller than the threshold value $\Delta$. This part of dependencies shown in FIG. 8 provides the noise suppression. The weighting coefficient smoothly increases from its minimal value to its maximal value for correlation values that are close to the threshold value $\Delta$. Finally, the weighting coefficient takes its maximal value for correlation values that are significantly larger than $\Delta$. This part of dependencies illustrated by FIG. 8 provides non-distorted reproduction of edges.

Alternatively, the weighting coefficient $W_i$ may increases from its minimal value to its maximal value while the correlation value is in the range between the threshold value $\Delta$ and the second threshold value, being equal to the first threshold value $\Delta$ multiplied by some constant coefficient. The weighting coefficient $W_i$ decreases when the correlation value becomes higher than the second threshold value. Therefore the weighting coefficient $W_i$ takes a maximum for correlation values larger than the threshold value $\Delta$. This behavior of the weighting coefficient $W_i$ provides the emphasis of the weak edges thus improving the image quality.

The memory units $26_1$–$26_4$ accumulate values of the weighting coefficients generated by look-up tables $25_1$–$25_4$. The address generator 27 and adders $28_1$–$28_4$ smooth the weighting coefficients in each frequency channel. The smoothing is obtained by summing in the adder (for example, $28_1$) the center value of the coefficient and its neighboring values being sequentially selected from the memory unit (for example, $26_1$) by the address generator 27. The smoothed values of the weighting coefficients formed on the outputs of the adders (for example, $28_1$) pass to the outputs of the weighting unit 4.

The operation of the assembling unit 5 is described with a reference to FIG. 5. The values of weighting coefficients for four frequency channels pass from the outputs of the unit 4 to the inputs $8_1$–$8_4$ of multiplicators $29_1$–$29_4$, whereas the pixel values of the corresponding frequency channels are carried from outputs of the splitting unit 2 to other inputs $10_1$–$10_4$ of these multiplicators. The products of the pixel values by the corresponding weighting coefficients generated by multiplicators $29_1$–$29_4$ pass to the inputs of the adder 30. Thereto the corresponding pixel value of the low frequency channel passes to the input 9 of the adder. The adder 30 adds the pixel value of the low frequency channel to all values of the corresponding (by their location in the image) pixels of the high frequency channels, the latest values are multiplied (in multiplicators $29_1$–$29_4$) by their respective weighting coefficients. The memory unit 6 accumulates pixels of the output image.

The embodiment described herein illustrates the method as applied to 2D scalar images. It is understood however that the claimed method may be applied similarly to 3D images. In this case, in the apparatus used to implement the claimed method, the number of frequency channel increases, the 3D Fourier processors are used instead of 2D ones, and the number of pixels in the neighborhood of the processed pixel (used, for example, to compute a correlation value) is 26 instead of 8.

The claimed method may be applied also to processing vector images, particularly the color images. Thereat, three components of a vector presenting a pixel value may correspond, for example, to the intensity of the three basic colors for this pixel. In this case, the scalar operations on pixel values, like Fourier transform and summing, are replaced by the corresponding vector operations as it is known in the art, and the correlation is computed as a scalar product of the center pixel value and the weighted vector sum of its neighbors, thereat the vector adder contains as many scalar adders as the number of vector components.

For different parts of the image, different threshold values can be used to form weighting coefficients in at least one of the n−1 high frequency channels. When a picture element is represented by a scalar value, the threshold values for the different parts of the image and different high frequency channels are determined by analyzing distribution of pixel values in a corresponding part of the image of a corresponding frequency channel. On the other hand, when a picture element is represented by a vector, the threshold values for the different parts of the image and different high frequency channels are determined by analyzing distribution of absolute values of vectors representing pixels in a corresponding part of the image of a corresponding frequency channel.

INDUSTRIAL APPLICABILITY

The image processing method according to the invention has the following advantages:

First, the use of the correlation between the processed pixel and its neighboring pixels helps detect weak edges against a noisy background. This feature provides high noise suppression in conjunction with the emphasis of weak edges, thus significantly improving the image quality. Furthermore, use of correlation between the processed pixel and its neighbors makes the method applicable to a wide variety of image types, including color images, gray scale images and 3D images.

Second, the determination of the threshold value by analysis of distribution of pixel values provides a high quality processing of images with the material difference in their noise levels without changing parameters.

Third, the distortion-free reproduction of large-scale image structures is achieved due to separation of the low frequency channel.

What is claimed is:

1. The method of image processing, comprising the steps of:
   providing an original image as a matrix of discreet picture elements pixels,
   splitting said original image into n frequency channels, each of said n channels being presented by an image matrix of the same size as said original image, detecting edges, and assembling an output image from said n frequency channels taking said detected edges into account, wherein said splitting said original image is performed into a low frequency channel and n−1 high frequency channels, wherein said detecting edges is made by calculating in each of said n−1 high frequency channels for each pixel a correlation value between a processed pixel and its neighboring pixels followed by comparing said correlation value with correlation values for the corresponding, by their location in the image, pixels in other said high frequency channels and with a first threshold value for this channel; and forming weighting coefficients based on the results of said comparing for each pixel of each of n−1 high frequency channels, and said assembling said output image is made by summing each pixel from said low frequency channel with all the corresponding, by their location in the image, pixels of said n−1 high frequency channels multiplied by their weighting coefficients.

2. The method according to claim 1, wherein said forming weighting coefficients for each pixel of said each of said n−1 high frequency channels is made by comparing said corresponding correlation value to said first threshold value.

3. The method according to claim 2, wherein a weighting coefficient takes a minimal value for correlation values that are significantly smaller than said first threshold value; said weighting coefficient smoothly increases from its minimal value to its maximal value for correlation values that are close to said first threshold value; and said weighting coefficient takes its maximal value for correlation values that are significantly larger than said first threshold value.

4. The method according to claim 2, wherein a weighting coefficient takes a minimal value for correlation values that are significantly smaller than said first threshold value; said weighting coefficient smoothly increases from its minimal value to its maximal value while said correlation value increases to a second threshold value, said second threshold value being equal to a product of said first threshold value by a pre-defined coefficient; and said weighting coefficient smoothly decreases from its maximal value to its limit value while said correlation value is larger than said second threshold value.

5. The method according to claim 1, wherein m of said n−1 high frequency channels, where $2 \leq m \leq n-1$, are different from one another in a direction of their principal passing only.

6. The method according to claim 5, wherein said forming weighting coefficients for each pixel of each of said m high frequency channels is made by comparing said corresponding correlation value to said first threshold value and to said correlation values for corresponding (by their location in the image) pixels of other m−1 high frequency channels.

7. The method according to claim 1, wherein each of said picture elements pixel is represented by a scalar value.

8. The method according to claim 7, wherein said correlation value is calculated for each pixel by multiplication of said pixel value by a weighted sum of its neighboring pixels.

9. The method according to claim 8, wherein m of said n−1 high frequency channels, where $2 \leq m \leq n-1$, are different from one another in a direction of their principal passing only, and anisotropic weights are used for calculating said weighted sum of said neighboring pixels, a direction of said anisotropy corresponding to said direction of principal passing for a corresponding processed frequency channel.

10. The method according to claim 7, wherein said threshold value for each of said n−1 high frequency channels is determined by analyzing distribution of pixel values in an image of a corresponding processed frequency channel.

11. The method according to claim 7, wherein said threshold value for all said frequency channels is determined by analyzing distribution of pixel values of said original image.

12. The method according to claim 1, wherein each of said pixels is represented by a vector.

13. The method according to claim 12, wherein said correlation value for each pixel is calculated as a scalar product of said pixel vector by a weighted sum of vectors representing its neighboring pixels.

14. The method according to claim 13, wherein m of said n−1 high frequency channels, where $2 \leq m \leq n-1$, are different from one another in a direction of their principal passing only and anisotropic weights are used for calculating said weighted sum of said neighboring pixels, a direction of said anistropy corresponding to said direction of principal passing for a corresponding processed frequency channel.

15. The method according to claim 12, wherein said threshold value for each of said n−1 high frequency channels is determined by analyzing distribution of absolute values of vectors representing pixels of an image of a corresponding processed frequency channel.

16. The method according to claim 12, wherein said threshold value for each of all high frequency channels is determined by analyzing distribution of absolute values of vectors representing pixel values of said original image.

17. The method according to claim 1, wherein correlation values for several neighboring pixels are smoothed before said forming said weighting coefficients, said smoothing being implemented at least in one of n−1 high frequency channels.

18. The method according to claim 17, further including non-linear transforming said correlation values prior to said smoothing said correlation values, said non-linear transforming remaining unchanged those of said correlation values that are smaller or close to said first threshold value, and decreasing those of said correlation values that are significantly larger than said first threshold value.

19. The method according to claim 1, further comprising smoothing said weighting coefficients over neighboring pixels, said smoothing being implemented at least in one of said n−1 high frequency channels.

20. The method according to claim 1, wherein said original image is a p-dimensional matrix of said picture elements, where p is greater than or equal to 3.

21. The method according to claim 1, wherein different threshold values are used for different parts of said image, said different threshold values being used to form said weighting coefficients at least in one of said n−1 high frequency channels.

22. The method according to claim 21, wherein a picture element of said picture elements is represented by a scalar value and said threshold values for said different parts of said image and different high frequency channels are determined by analyzing distribution of pixel values in a corresponding part of said image of a corresponding frequency channel.

23. The method according to claim 21, wherein a picture element of said picture elements is represented by a vector and said threshold values for said different parts of said image and different frequency channels are determined by analyzing distribution of absolute values of vectors representing pixels in a corresponding part of said image of a corresponding frequency channel.

* * * * *

UNITED STATES PATENT AND TRADEMARK OFFICE
CERTIFICATE OF CORRECTION

PATENT NO. : 6,985,636 B1
DATED : January 10, 2006
INVENTOR(S) : Michael Semenchenko

It is certified that error appears in the above-identified patent and that said Letters Patent is hereby corrected as shown below:

<u>Column 10,</u>
Lines 63 and 64, delete "discreet picture elements".

<u>Column 11,</u>
Line 4, change "performed" to -- made --.
Line 7, change "made" to -- performed --.
Line 55, delete "picture elements".

Signed and Sealed this

Eleventh Day of April, 2006

JON W. DUDAS
*Director of the United States Patent and Trademark Office*